United States Patent [19]

Hotine

[11] Patent Number: 4,996,503
[45] Date of Patent: Feb. 26, 1991

[54] PHASE MODULATOR CIRCUIT FOR ENCODING TWO BINARY DIGITS PER CYCLE OF SINE WAVE CARRIER

[76] Inventor: William Hotine, 633 Ramona Ave. #23, Los Osos, Calif. 93402

[21] Appl. No.: 541,825

[22] Filed: Jun. 21, 1990

[51] Int. Cl.[5] .......................... H04L 27/20; H03C 3/00
[52] U.S. Cl. ........................................ 332/104; 375/52; 375/67
[58] Field of Search .................. 332/104; 375/144, 53, 375/86, 67, 52

[56] References Cited

U.S. PATENT DOCUMENTS 3,394,313  7/1968  Ellis et al. ........................ 332/144 X
4,937,840  6/1990  Hotine .............................. 375/67 X Primary Examiner—David Mis

[57] ABSTRACT

A phase modulator circuit for encoding successive serial binary digits at the zero crossing points of a sine wave carrier. A digital one is encoded as a brief phase deviation of the carrier and a digital zero as the normal wave form. The carrier frequency is one-half the clock frequency of the encoded data. A digital processing circuit operating at one-half the clock frequency of the data controls one shot multivibrators which control electronic switches to deviate the carrier.

3 Claims, 2 Drawing Sheets 4,996,503

PHASE MODULATOR CIRCUIT FOR ENCODING TWO BINARY DIGITS PER CYCLE OF SINE WAVE CARRIER

BACKGROUND OF THE INVENTION

The present invention is an improvement over the circuit shown on Applicant's U.S. Pat. No. 4,937,840 issued to Applicant William Hotine on Jun. 26, 1990. This patent describes a circuit in which serial binary digits having a clock frequency the same as the sine wave carrier frequency are encoded as brief phase deviations at the start of a cycle of carrier frequency for a digital one, digital zero being the normal wave form. The clock frequency is encoded by a brief phase deviation at the middle of each cycle of the carrier frequency. One binary digit is encoded per cycle of the carrier frequency by this circuit.

SUMMARY OF THE INVENTION

The present invention is an improved circuit which encodes two binary digits per cycle of the carrier frequency and uses the carrier to transmit the clock. The present invention uses a digital processing circuit operating at a clock frequency of one-half the clock frequency of the digital data being encoded. A square wave oscillator at the clock frequency of the data being encoded is divided by two to furnish the square wave clock frequency for the digital processing circuit. The positive half of this half clock frequency is equal in duration to the total period of a cycle of the clock frequency for a first serial binary digit being encoded. The inverted half clock frequency positive half wave is equal in duration to the total period of the clock frequency for a second serial binary digit. A sine wave carrier is derived from the inverted half clock frequency with its phase synchronous with the half clock frequency. The binary digital input is connected to the first inputs of two AND gates. The second input of the first AND gate is enabled by the positive half of the half clock frequency. The second input of the second AND gate is enabled by the positive half of the inverted half clock frequency. The AND gate outputs trigger one shot multivibrators when digital ones appear at the first inputs of the AND gates. When digital zeros appear, the multivibrators are quiescent. The outputs of the multivibrators control the inputs of two inverters, the outputs of which control two semi conductor bilateral switches in series which feed the carrier to the output when closed. When a multivibrator is quiescent, the connected inverter input is low and its output high which closes a semiconductor bilateral switch and transmits the carrier. When a multivibrator pulse for a one occurs, the connected inverter input is high and its output low, thus opening the semiconductor bilateral switch to interrupt the carrier for the duration of the multivibrator pulse. The mulitvibrator outputs are also connected to directly control two semiconductor bilateral switches which connect the output of a carrier phase shift circuit to the output circuit for the duration of a multivibrator pulse. As the pulses are timed by the positive rising edges of the half clock frequency and its inversion, they occur at the zero crossing points of the sine wave carrier.

OBJECTS OF THE INVENTION

The object of the invention is to provide a digital processing circuit for encoding two successive serial binary digits on a single cycle of a sine wave carrier frequency at the zero crossing points.

DESCRIPTION OF THE PREFERRED EMBODIMENT

Figure 1:
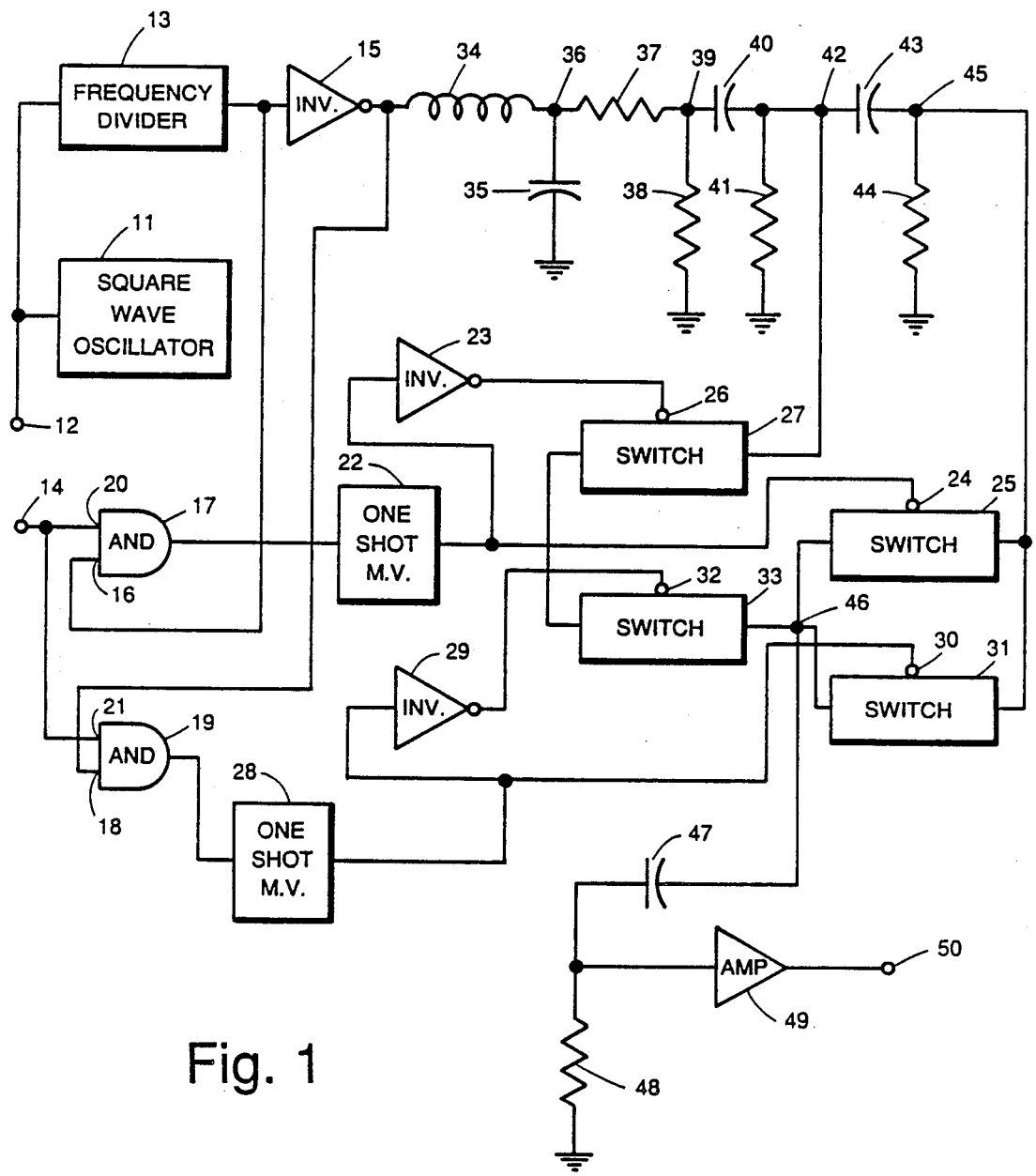
FIG. 1 is a schematic diagram of a digital processing circuit and wine wave generator for receiving serial binary digits at a clock frequency, generating a synchronous sine wave carrier at one-half clock frequency, and encoding two successive binary digits at the zero crossing points of the sine wave carrier.

Referring to FIG. 1, a square wave oscillator 11 generates a clock frequency which is fed to terminal 12 and to the input of a frequency divider 13. The clock frequency at terminal 12 is used externally for timing serial binary digits at input terminal 14. The output of frequency divider 13 is a square wave at one-half the clock frequency and drives inverter 15 and the first input 16 of AND gate 17. The output of inverter 15 drives the first input 18 of AND gate 19. The input terminal 14 is connected to the second input 20 of AND gate 17 and to the second input 21 of AND gate 19. The positive half of the half clock frequency wave form is equal in its duration to a first binary digit at the clock frequency as the digit reaches input terminal 14. This positive half of the half clock frequency enables AND gate 17. A binary digital one at this time at input terminal 14 will give a one output from AND gate 17, a digital zero a zero output. The positive half of the inverted half clock frequency is also equal in its duration to a successive binary digit at the clock frequency as this digit reaches input terminal 14. This positive half of the inverted half clock frequency enables AND gate 19. A binary one at this time will give a one output from AND gate 19, a digital zero a zero output. In this way, successive incoming binary digits at terminal 14 alternately control the outputs of AND gates 17 and 19.

A digital one at the output of AND gate 17 will trigger the connected one shot multivibrator 22, the output of which is connected to the input of inverter 23 and the control terminal 24 of a type 4066 semiconductor bilateral switch 25. The output of inverter 23 is connected to the control terminal 26 of semiconductor bilateral switch 27. A digital one at the output of AND gate 19 will trigger the one shot multivibrator 28, the output of which is connected to the input of inverter 29 and the control terminal 30 of a semiconductor bilateral switch 31. The output of inverter 29 is connected to the control terminal 32 of semiconductor bilateral switch 33. The output of inverter 15 is connected to inductance 34 which with capacitor 35 forms a low pass filter, the ouput of which at point 36 is a sine wave with its phase lagging the square wave input. Resistances 37 and 38 form a voltage divider the output of which at point 39 is a suitable low voltage that is within the rating of the semiconductor bilateral switches 25, 27, 31 and 33. Capacitor 40 and resistor 41 form a leading phase shift circuit which brings the sine wave carrier at point 42 into synchronous phase with the half clock frequency square wave output of frequency divider 13. Capacitor 43 and resistor 44 form a leading phase shift circuit the output of which at point 45 is connected to the inputs of switches 25 and 31. The sine wave carrier at point 42 is connected to the input of switch 27, the output of which is connected to the input of switch 33. The output of switch 33 is connected to point 46. The outputs of switches 25 and 31 are also connected to point 46. Capacitor 47 and resistor 48 couple the signal at point 46 to the input of a buffer amplifier 49 the output of which is connected to the output terminal 50.

When multivibrators 22 and 28 are quiescent, the outputs of inverters 23 and 29, are high and close switches 27 and 33, thus conducting the carrier from point 42 to point 46. When multivibrator 22 gives an output pulse for binary one, it simultaneously closes switch 25 while inverter 23 opens switch 27. When multivibrator 28 gives an output pulse for a binary one, it simultaneously closes switch 31 while inverter 29 opens switch 33. When switch 25 closes, a phase shifted carrier is connected to point 46 during the duration of the multivibrator pulse. When switch 31 closes, a phase shifted carrier is connected to point 46 during the duration of the multivibrator pulse. The brief phase modulation of the carrier thus takes place at the zero crossing points of the carrier wave form.

Figure 2:
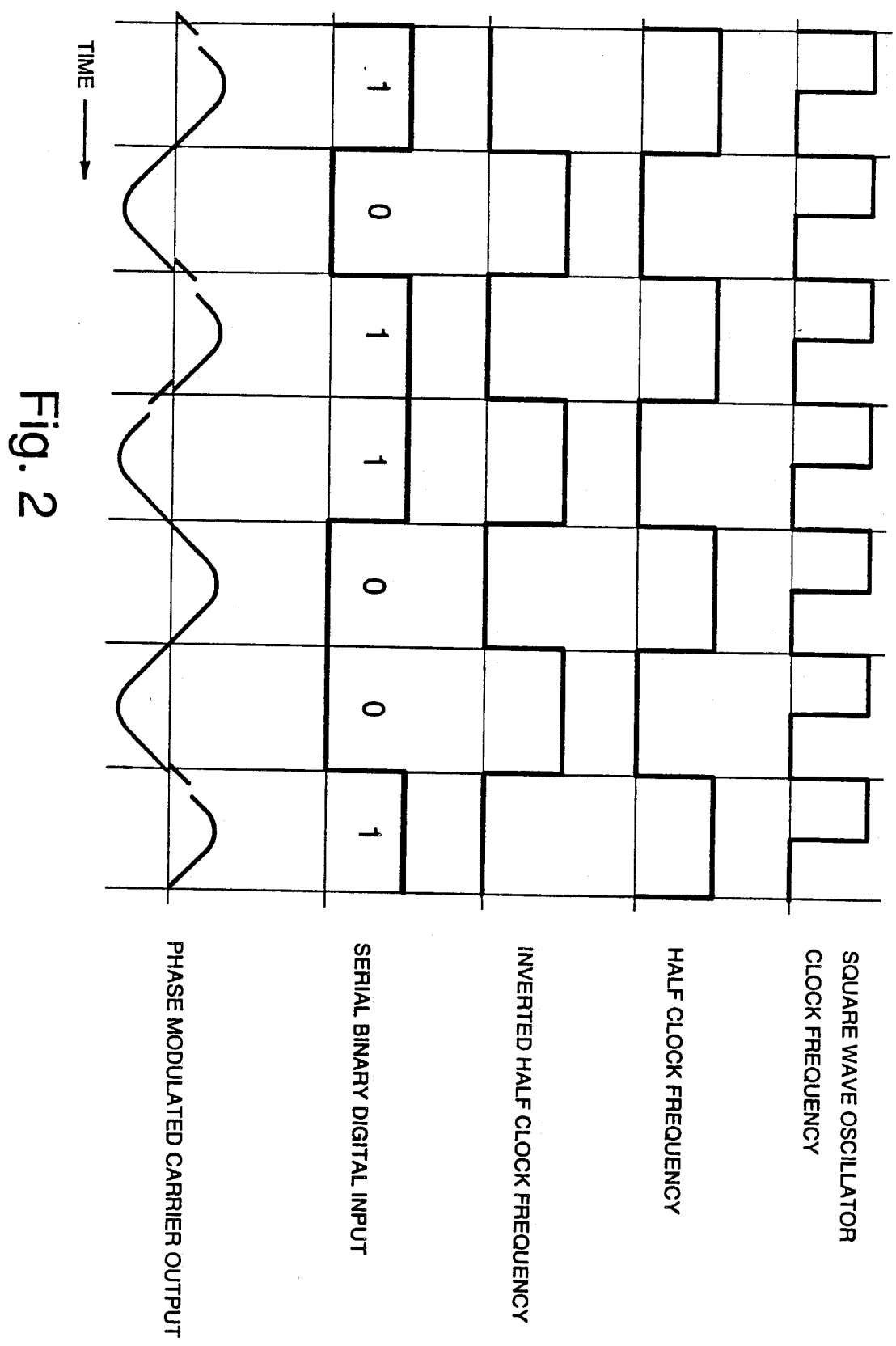
FIG. 2 is a timing diagram of circuit wave forms.

With reference to FIG. 2, the timing of the various wave forms of the circuit of FIG. 1 is graphically shown, to show the action of the circuit when a program of binary digits 1011001 is applied to the input terminal 14 of the circuit of FIG. 1.

While the preferred embodiment of the invention has been described, the form of the invention should be considered as illustrative and not as limiting the scope of the following claims.

I claim:

1. A phase modular circuit for encoding two binary digits per cycle of carrier frequency comprising:
   a square wave oscillator having an output at the clock frequency;
   a frequency divider receiving the clock frequency output of said oscillator and having a square wave output of one-half said clock frequency;
   a first inverter receiving the output of said frequency divider and having an output of an inverted half clock frequency;
   a first AND gate receiving the square wave output of said frequency divider at its first input;
   a second AND gate receiving the output of said first inverter at its first input;
   externally generated serial binary digital data clocked by said clock frequency driving the second inputs of said first and second AND gates;
   a first one shot multivibrator triggered by the output of said first AND gate and having a pulse output driving a second inverter;
   a second one shot multivibrator triggered by the output of said second AND gate and having a pulse output driving a third inverter;
   a low pass filter circuit for converting the square wave output of said first inverter to a sine wave carrier;
   a first phase shift circuit for synchronizing the phase of the sine wave carrier with the square wave half clock frequency;
   a second phase shift circuit receiving said carrier and having a phase shifted carrier output;
   a first semiconductor bilateral switch having a control terminal driven by the output of said second inverter and with its input receiving said carrier frequency;
   a second semiconductor bilateral switch having a control terminal driven by the output of said third inverter, with its input receiving the output of said first semiconductor bilateral switch and with its output coupled to an output circuit;
   a third semiconductor bilateral switch having a control terminal driven by the output of said first one shot multivibrator with its input receiving the output of said second phase shift circuit and with its output coupled to an output circuit;
   a fourth semiconductor bilateral switch having a control terminal driven by the output of said second one shot multivibrator, with its input receiving the output of said second phase shift circuit and with its output coupled to an output circuit and
   said AND gates receiving serial binary digital data at their second inputs and being enable alternately by said half clock frequency and its inversion to control said semiconductor bilateral switches in a manner to connect said carrier or pulsed phase deviations of said carrier to said output circuit whereby successive input serial binary digits are encoded at the successive zero crossing points of the carrier.

2. The method of phase modulation which comprises:
   receiving serial binary digits timed at a clock frequency at the input of a digital processing circuit;
   generating a square wave at one-half of said clock frequency and clocking said digital processing circuit at said half clock frequency;
   deriving a sine wave carrier which is in phase synchronism with said half clock frequency;
   shifting the phase of said carrier frequency;
   controlling the input of said digital processing circuit by said half clock frequency and its inversion in a manner to receive successive serial binary digits alternately at two input ports;
   connecting said carrier and said phase shifted carrier to an output circuit by means of semiconductor bilateral switches controlled by said digital processing circuit and
   operating said digital processing circuit to control said switches in a manner to connect either said carrier or said phase shifted carrier to said output circuit and to briefly deviate said carrier at its zero crossing points according to successive input binary digits received by said digital processing circuit.

3. A phase modulator circuit for encoding two binary digits per cycle of carrier frequency comprising:
   means for providing a clock frequency for externally generated serial binary digits;
   means for providing a half clock frequency and its inversion;
   gating means to receive successive serial binary digits alternately at two inputs of a digital processing circuit clocked by said half clock frequency;
   means for deriving a phase synchronous sine wave carrier from said half clock frequency;
   means for shifting the phase of said carrier;
   semiconductor bilateral switching means for connecting either said carrier or a phase shifted carrier to an output circuit;
   digital processing circuit means for producing short pulses at the start and at the middle of said half clock frequency and controlling said switches by said pulses and their complements whereby successive input binary digits control the modulation of brief phase deviations of said carrier at its successive zero crossing points.

* * * * *